(12) United States Patent
Benarous

(10) Patent No.: US 10,263,491 B2
(45) Date of Patent: Apr. 16, 2019

(54) ELECTROMECHANICAL ACTUATOR DAMPING

(71) Applicant: Goodrich Actuation Systems Limited, Solihull, West Midlands (GB)

(72) Inventor: Maamar Benarous, West Midlands (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 386 days.

(21) Appl. No.: 15/135,854

(22) Filed: Apr. 22, 2016

(65) Prior Publication Data

US 2016/0315519 A1     Oct. 27, 2016

(30) Foreign Application Priority Data

Apr. 22, 2015    (EP) ..................... 15164686

(51) Int. Cl.
| | | |
|---|---|---|
| *H02K 5/24* | (2006.01) |
| *H02K 1/02* | (2006.01) |
| *H02K 1/16* | (2006.01) |
| *H02K 3/48* | (2006.01) |
| *H02K 3/20* | (2006.01) |

(52) U.S. Cl.
CPC ................ *H02K 5/24* (2013.01); *H02K 1/02* (2013.01); *H02K 1/165* (2013.01); *H02K 3/20* (2013.01); *H02K 3/48* (2013.01)

(58) Field of Classification Search
CPC .......... H02K 1/165; H02K 1/265; H02K 3/12; H02K 3/16; H02K 1/04; H02K 3/48
USPC ................... 310/51, 124–125, 151, 210–212
See application file for complete search history.

(56) References Cited

U.S. PATENT DOCUMENTS

| | | | |
|---|---|---|---|
| 2008/0079401 A1 | 4/2008 | Dooley | |
| 2013/0342041 A1* | 12/2013 | Ayers ...................... | H02P 27/08 310/50 |

FOREIGN PATENT DOCUMENTS

DE    401111 C    8/1924

OTHER PUBLICATIONS

Extended European Search Report of the European Patent Office for International Application No. EP15164686, dated Dec. 21, 2015, 7 pages.

* cited by examiner

*Primary Examiner* — Thanh Lam
(74) *Attorney, Agent, or Firm* — Cantor Colburn LLP

(57) ABSTRACT

The invention provides a stator for an electric motor comprising a plurality of teeth separated by slots, and comprising conductive material provided in the slots between two or more of the teeth.

3 Claims, 4 Drawing Sheets

ELECTROMECHANICAL ACTUATOR DAMPING

FOREIGN PRIORITY

This application claims priority to European Patent Application No. 15164686.6 filed Apr. 22, 2015, the entire content of which is incorporated herein by reference.

TECHNICAL FIELD

The present invention is concerned with a damping arrangement for an electromechanical actuator (EMA).

BACKGROUND OF THE INVENTION

Electromechanical actuators are used in a wide range of technology for actuating system parts, for example in engine, machine, vehicle or aviation technology.

An EMA motor comprises a stator assembly and a rotor. Power is supplied to the stator which results in generation of forces causing the rotor to rotate relative to the stator.

A stator assembly generally comprises a cylindrical back plate and a plurality of teeth extending radially inwards from the inner surface of the back plate. The teeth are separated by slots and electromagnetic coils are wound between the slots. The teeth surround a rotating central rotor having corresponding teeth. The resulting stator electromagnets are successfully energized by an external control circuit. As each electromagnet is powered, this creates an attractive force between the stator teeth and the rotor teeth to cause rotation of the rotor relative to the stator. A stator assembly generally consists of a set of magnetic steel laminations insulated from each other and glued, pressed or welded to form the stator core pack.

Laminations are slotted, and wound with typically copper wire to form one or more pairs of magnetic poles when energized by an external supply.

As the stator coils are energized they generate a magnetic field which will interact with the field produced by a set of magnets (in this case permanent magnets) placed on the motor rotor. The interaction between the two fields enables the motor to rotate.

Electromechanical actuators are finding increased use in applications where previously hydraulic actuators have been used, e.g. in aircraft, such as in the primary and secondary flight control actuators and nose wheel steering systems, and also in many other fields, such as elevators, ships etc.

Damping is often required in actuation systems or motor driven systems. For certain applications such as aileron, elevator or rudder for primary flight control or nose wheel steering damping function is required.

This function is necessary to prevent flutter of aerodynamic surface for an aileron, elevator and rudder in case of a power loss scenario. It also prevents hitting roughly the mechanical stops in the situation of wind gust.

For a nose wheel steering application damping will minimize nose wheel shimmy which is undesirable, and destructive.

Where hydraulic systems are used, the damping function is provided by a bypass restrictor. Where an EMA is used, however, there is no hydraulic fluid and so an alternative damping mechanism is required. Existing EMA systems have used a damper unit or component bolted on to the electric motor, e.g. to the motor shaft. This, whilst effective, increases the overall weight and size of the motor and involves increased manufacture time and costs.

The present invention aims to provide an improved electromechanical actuator motor damping arrangement.

SUMMARY

The invention provides a stator for an electric motor comprising a plurality of teeth separated by slots, and comprising conductive material provided in the slots between two or more of the teeth.

By incorporating conductive material, e.g. in the form of bars, into the stator slots, a damping function can be achieved. The bars or the like can be located in the space usually occupied by stator slot wedges used to hold the stator windings in the slots formed between the stator teeth. The damping bars can then provide both a damping function, as well as a mechanical retainer for the windings.

The conductive material is preferably nonmagnetic with a given resistivity such as copper, aluminum, bronze, etc. The material choice depends on the desired performance required from the damper.

The conductive material may be in the form of rods or bars fitted into the stator slots just below the windings, although other configurations of conductive material could be provided in the slots.

In order to obtain damping torque, he conductive material needs to be shorted.

Where the conductive material is provided at or extends to the ends of the stator, the shorting can be done by, for example, providing a ring around the teeth in contact with the conductive material. The conductive material inserted into the stator slots need to be shorted to a cylindrical ring as it is a case in a conventional squirrel cage induction motor.

The conductor bars, for example, embedded in the stator slots may be welded or electrically braced or even bolted at both ends to an end ring, thus maintaining electrical continuity Such shorting is, in preferred embodiments, provided at each axial end of the rotor.

The magnitude of the damping torque can be tailored e.g. by selection of material resistivity or by shorting a defined number of bars rather than a complete ring.

In operation of the motor, as the rotor magnets rotate, the magnetic flux will induce voltage into the conductive material. The relative motion between the stator and the rotor will generate a torque which will oppose the useful torque produced by the motor. Eddy-currents are created by the relative motion between the rotating permanent magnets on the rotor, and the stationary conductive bars integrated into the motor stator. The generated currents induce a drag torque, hence a deceleration of motion.

The negative torque produced by the interaction of magnets and the cage on the stator needs to be overcome by the motor in case of positive torque demand.

The characteristic of the drag torque is function of the rotor speed, the area of the conductive bars and the resistivity of the bars for a given magnetic field.

BRIEF DESCRIPTION OF DRAWINGS

Preferred embodiments of the invention will now be described, by way of example only, with reference to the drawings.

DETAILED DESCRIPTION OF THE INVENTION

Figure 1A:
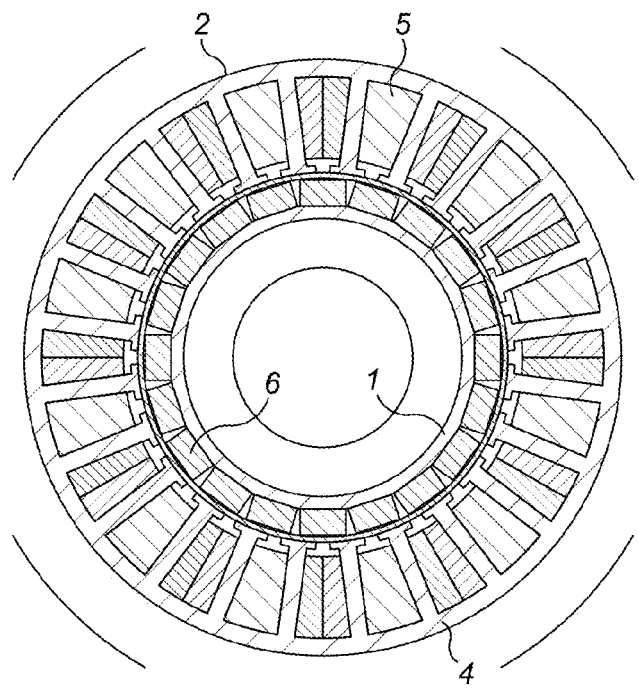
FIG. 1A is an end section view of the rotor and stator assembly of a conventional EMA motor.
Figure 1B:
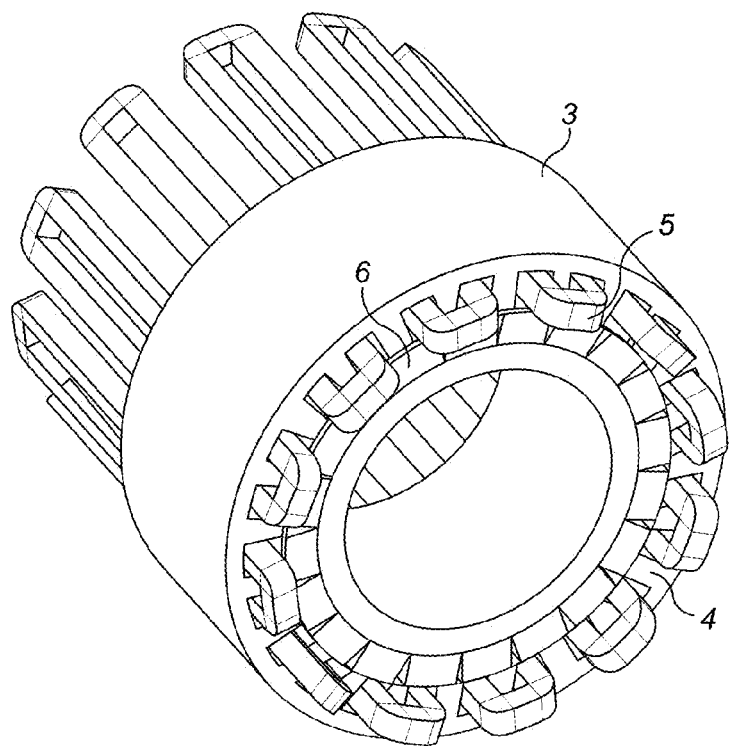
FIG. 1B is a partially cut-away perspective view of a conventional rotor and stator assembly.

Referring first to FIGS. 1A and 1B, an EMA generally comprises a motor having a rotor 1 and a stator 2 assembly.

A stator assembly usually consists of a stator core pack or back plate 3 which is usually formed of a set of magnetic steel laminations insulated from each other and glued, pressed or welded together to form the stator pack. Laminations are slotted, to define a series of inwardly extending teeth 4, and are wound with, typically, copper wire to form one or more pairs of magnetic poles 5 when energized by an external power supply.

As the stator coils 5 are energized, they generate a magnetic field which will interact with the field produced by a set of magnets 6, e.g. permanent magnets, placed on the motor rotor. The interaction between the two fields causes relative movement of the rotor to the stator enabling the motor to rotate.

Other forms of motor are also known, for example where the stator pack is formed from compressed iron powder or the like.

As can be seen, the form of the stator comprises teeth 4 extending radially inwards from the stator back plate 3.

Figure 2:
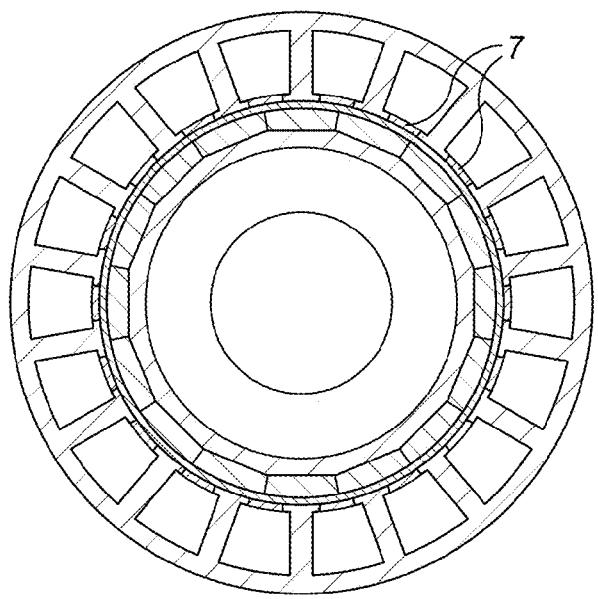
FIG. 2 is a sectional view through the motor according to an embodiment of the invention.
Figure 3:
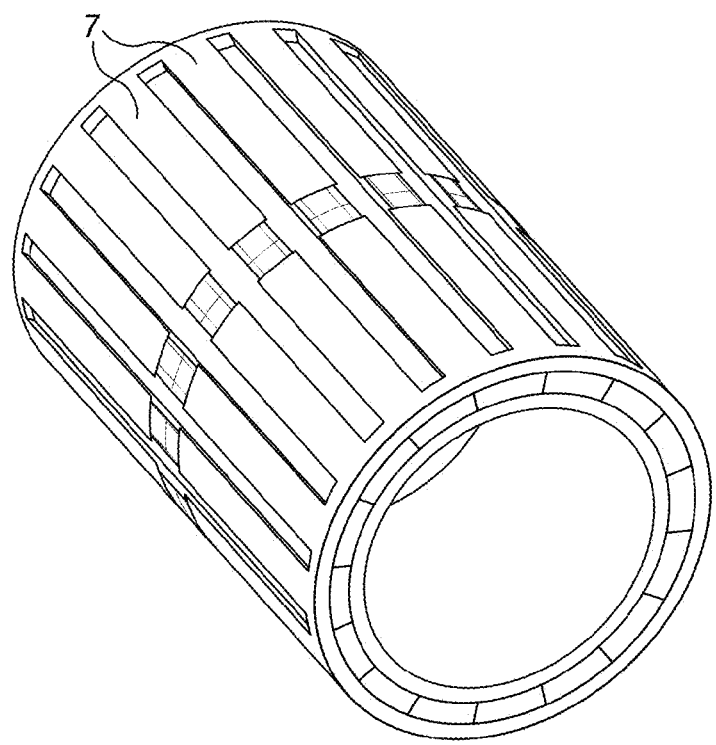
FIG. 3 is a perspective view of one embodiment of the invention with the stator removed for clarity.

As seen in FIGS. 2 and 3, in the present invention, damper bars or rods 7 are arranged in the stator slots between the teeth, preferably underneath the coils or windings.

To provide the damping effect, the damper bars are shorted.

In one example, a ring 8 is provided at each end of the stator pack, making contact with the respective ends of the damper bars to provide shorting.

Various forms of such a shorting ring or construction are possible. In some embodiments, all of the damper bars are shorted, but in other embodiments, only some bars need to be shorted.

The ring can be a continuous simple ring (FIG. 3) at the ends of the stator pack, making contact with all of the damper bars.

FIGS. 4A to 4E show a number of possible variations for shorting the damper bars. Other variations are also conceivable.

Figure 4A:
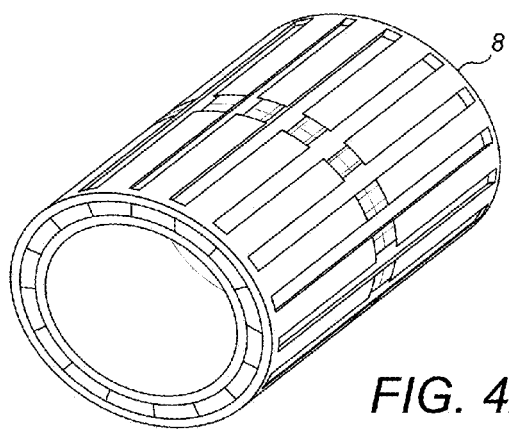
FIGS. 4A to 4E show some possible bar configurations.

FIG. 4A shows an embodiment in which all of the bars are shorted by providing continuous rings at two ends of the stator pack.

Figure 4B:
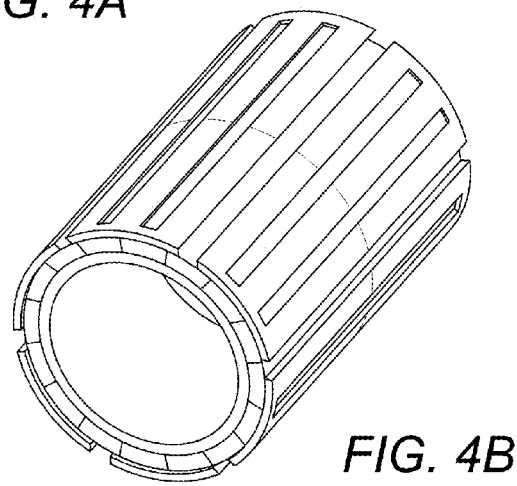
Figure 4C:
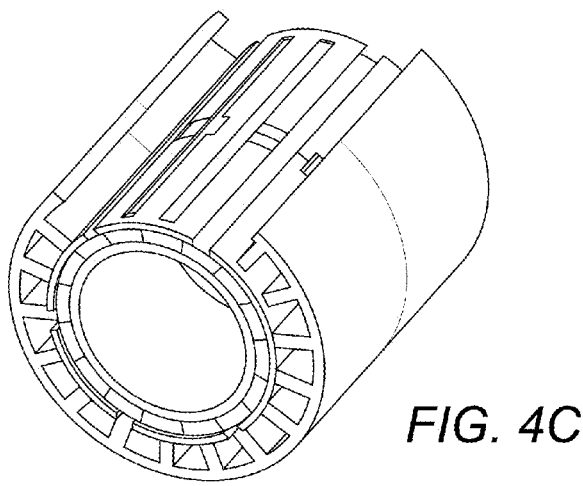

In the embodiment of FIG. 4B, bars are shorted in groups of three. FIG. 4C shows how an embodiment such as shown in FIG. 4B is fitted into the stator pack.

Figure 4D:
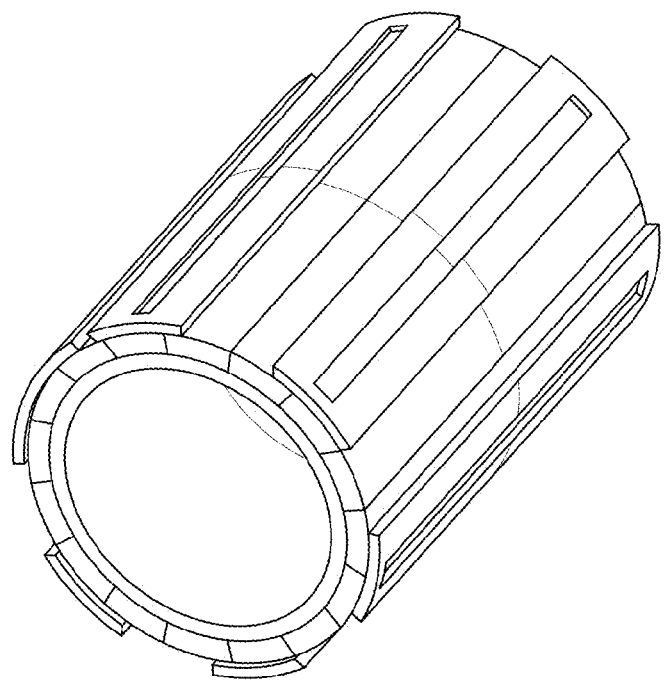
Figure 4E:
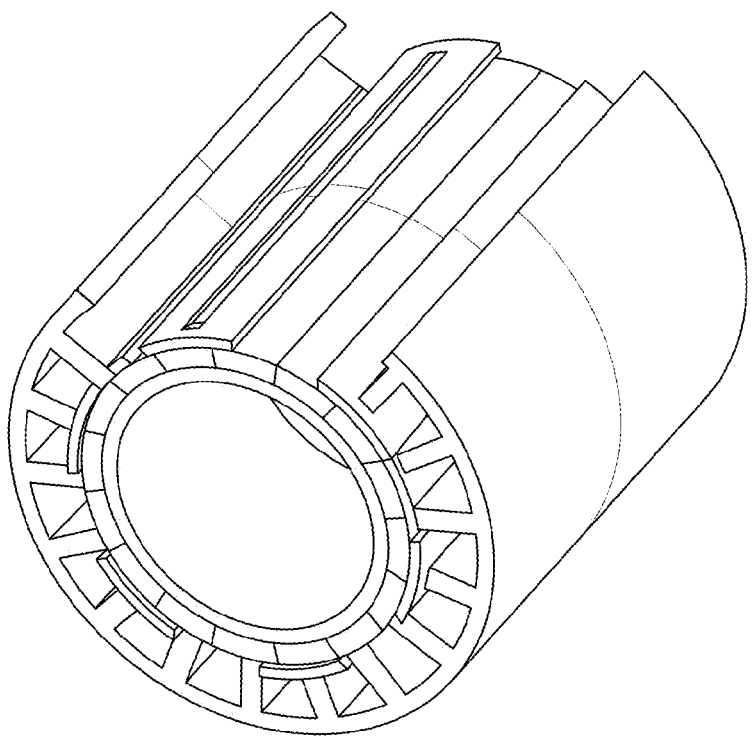

Another embodiment is shown in FIG. 4D, in which bars are shorted in pairs and FIG. 4E shows how such an embodiment is built into the stator pack.

The magnitude of damping can be controlled by selecting an appropriate shorting configuration, for example by shorting a given number of bars. Alternatively, or in addition, the damping characteristic can be changed by changing the damper bar material.

The present invention thus provides a passive damper arrangement integrated into an existing EMA electric motor, which has a robust and reliable construction.

The present invention allows the damping function to be integrated into the motor components, as a single unit. Integration of the damper into the electric motor reduces both the volume and weight of the actuator and also enables the use of a single set of magnets for both motoring and damping. This will have a direct impact on the cost of the actuator. Furthermore, the reduction of component parts will increase its reliability.

The invention claimed is:

1. An actuator comprising an electric motor, the electric motor including:
   a rotor; and
   a stator, the stator including a plurality of radially inwardly extending teeth separated by slots; and
   a damping means to provide a damping function to the actuator, the damping means including a rods or bars of electrically conductive material provided in the slots between two or more of the stator teeth;
   wherein the rods or bars extend along the slots from one axial end of the stator to the other axial end; and
   a means for shorting the conductive material, the means for shorting including a shorting ring at an axial end of the stator in contact with the rods or bars of electrically conductive material.

2. The actuator of claim 1, wherein the conductive material is non-magnetic.

3. The actuator of claim 1, wherein the means for shorting comprises a shorting ring at each axial end of the stator.

* * * * *